(12) United States Patent
Yamada et al.

(10) Patent No.: US 12,081,116 B2
(45) Date of Patent: Sep. 3, 2024

(54) SWITCHING CONTROL CIRCUIT AND POWER SUPPLY CIRCUIT

(71) Applicant: FUJI ELECTRIC CO., LTD., Kawasaki (JP)

(72) Inventors: Ryuji Yamada, Hachioji (JP); Ryuunosuke Araumi, Hino (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 214 days.

(21) Appl. No.: 17/877,377

(22) Filed: Jul. 29, 2022

(65) Prior Publication Data

US 2023/0072309 A1 Mar. 9, 2023

(30) Foreign Application Priority Data

Sep. 8, 2021 (JP) .................................. 2021-145995

(51) Int. Cl.
*H02M 1/42* (2007.01)
*H02M 1/00* (2006.01)
*H02M 1/08* (2006.01)

(52) U.S. Cl.
CPC ....... *H02M 1/4225* (2013.01); *H02M 1/0012* (2021.05); *H02M 1/08* (2013.01)

(58) Field of Classification Search
CPC ........ H02M 1/42; H02M 1/4225; H02M 7/02; H02M 7/04; H02M 7/21; H02M 7/217; H02M 7/2176
See application file for complete search history.

(56) References Cited

U.S. PATENT DOCUMENTS

| 10,097,082 B1* | 10/2018 | Turchi | H02M 1/4225 |
| 2020/0144906 A1* | 5/2020 | Endo | H02M 3/33507 |
| 2021/0067032 A1* | 3/2021 | Hiasa | H02M 7/2176 |

FOREIGN PATENT DOCUMENTS

| JP | 2010104218 A | 5/2010 |
| JP | 2017085865 A | 5/2017 |
| JP | 2018064410 A | 4/2018 |
| JP | 2020014325 A | 1/2020 |

* cited by examiner

*Primary Examiner* — Gary L Laxton
(74) *Attorney, Agent, or Firm* — Rabin & Berdo, P.C.

(57) ABSTRACT

A switching control circuit for a power supply circuit, including: a first command value output circuit outputting a first command value; a correction circuit correcting the first command value, to output a second command value; a first timer circuit measuring a first time period starting from a first timing at which a transistor of the power supply circuit is turned on; and a driving signal output circuit outputting a driving signal to turn on the transistor in response to an inductor current of the power supply circuit reaching a predetermined value and the first time period having elapsed since the first timing, and outputting the driving signal to turn off the transistor based on the second command value. The correction circuit causes an on time period of the transistor to increase, when the first time period has elapsed since the first timing, after the inductor current reaches the predetermined value.

12 Claims, 16 Drawing Sheets

SWITCHING CONTROL CIRCUIT AND POWER SUPPLY CIRCUIT

CROSS-REFERENCE TO RELATED APPLICATION

The present application claims priority pursuant to 35 U.S.C. § 119 from Japanese patent application number 2021-145995 filed on Sep. 8, 2021, the entire disclosure of which is hereby incorporated by reference herein.

BACKGROUND

Technical Field

The present disclosure relates to a switching control circuit and a power supply circuit.

Description of the Related Art

A commonly used power factor correction circuit (hereinafter, referred to as a PFC circuit) that operates in a critical mode shapes a waveform formed of peak values of an inductor current flowing through an inductor into a similar shape of the waveform of a rectified voltage obtained by rectifying an alternating-current (AC) voltage, to thereby correct a power factor of a power supply (for example, Japanese Patent Application Publication Nos. 2010-104218, 2017-85865, 2018-64410, and 2020-14325).

In the PFC circuit operating in the critical mode, for example, a switching frequency of a power transistor may rise in a range in which a phase angle of the rectified voltage is small. When the switching frequency rises, losses in the power transistor and/or the inductor increase. Thus, in some PFC circuits, the switching frequency is limited so as not to reach a predetermined value or more.

However, when the switching frequency of the PFC circuit is limited, an off time period during which the power transistor is off increases, which makes it difficult for the waveform formed of the peak values of the inductor current to be shaped into a similar shape of the waveform of the rectified voltage.

SUMMARY

A first aspect of an embodiment of the present disclosure is a switching control circuit for a power supply circuit configured to generate an output voltage at a target level from an alternating-current (AC) voltage inputted thereto, the power supply circuit including an inductor configured to receive a voltage corresponding to the AC voltage, a transistor configured to control an inductor current flowing through the inductor, the switching control circuit being configured to control switching of the transistor, the switching control circuit comprising: a first command value output circuit configured to output a first command value corresponding to a difference between a feedback voltage corresponding to the output voltage and a reference voltage; a correction circuit configured to correct the first command value, to output a resultant value as a second command value; a first timer circuit configured to measure a first time period starting from a first timing at which the transistor is turned on; and a driving signal output circuit configured to output a driving signal to turn on the transistor in response to the inductor current reaching a predetermined value and the first time period having elapsed since the first timing, and output the driving signal to turn off the transistor based on the second command value, wherein the correction circuit corrects the first command value to thereby cause an on time period during which the transistor is on to increase, in a case where the first time period has elapsed since the first timing, after the inductor current reaches the predetermined value.

A second aspect of an embodiment of the present disclosure is a power supply circuit configured to generate an output voltage at a target level from an alternating-current (AC) voltage inputted thereto, the power supply circuit comprising: an inductor configured to receive a voltage corresponding to the AC voltage; a transistor configured to control an inductor current flowing through the inductor; and a switching control circuit configured to control switching of the transistor, wherein the switching control circuit includes a first command value output circuit configured to output a first command value corresponding to a difference between a feedback voltage corresponding to the output voltage and a reference voltage, a correction circuit configured to correct the first command value, to output a resultant value as a second command value, a first timer circuit configured to measure a first time period starting from a first timing at which the transistor is turned on, and a driving signal output circuit configured to output a driving signal to turn on the transistor in response to the inductor current reaching a predetermined value and the first time period having elapsed since the first timing, and output the driving signal to turn off the transistor based on the second command value, and wherein the correction circuit corrects the first command value to thereby cause an on time period during which the transistor is on to increase, in a case where the first time period has elapsed since the first timing, after the inductor current reaches the predetermined value.

DETAILED DESCRIPTION

At least following matters will become apparent from the descriptions of the present specification and the accompanying drawings. It is assumed hereinafter that a "circuit" of an embodiment of the present disclosure includes not only an analog circuit and a logic circuit of a wired logic-type but also a functional block (or means) that is included in a digital signal processor (DSP), a microcomputer, and/or the like and capable of executing digital arithmetic processing.

EMBODIMENTS

<<<Overview of AC-DC Converter 10>>>

Figure 1:
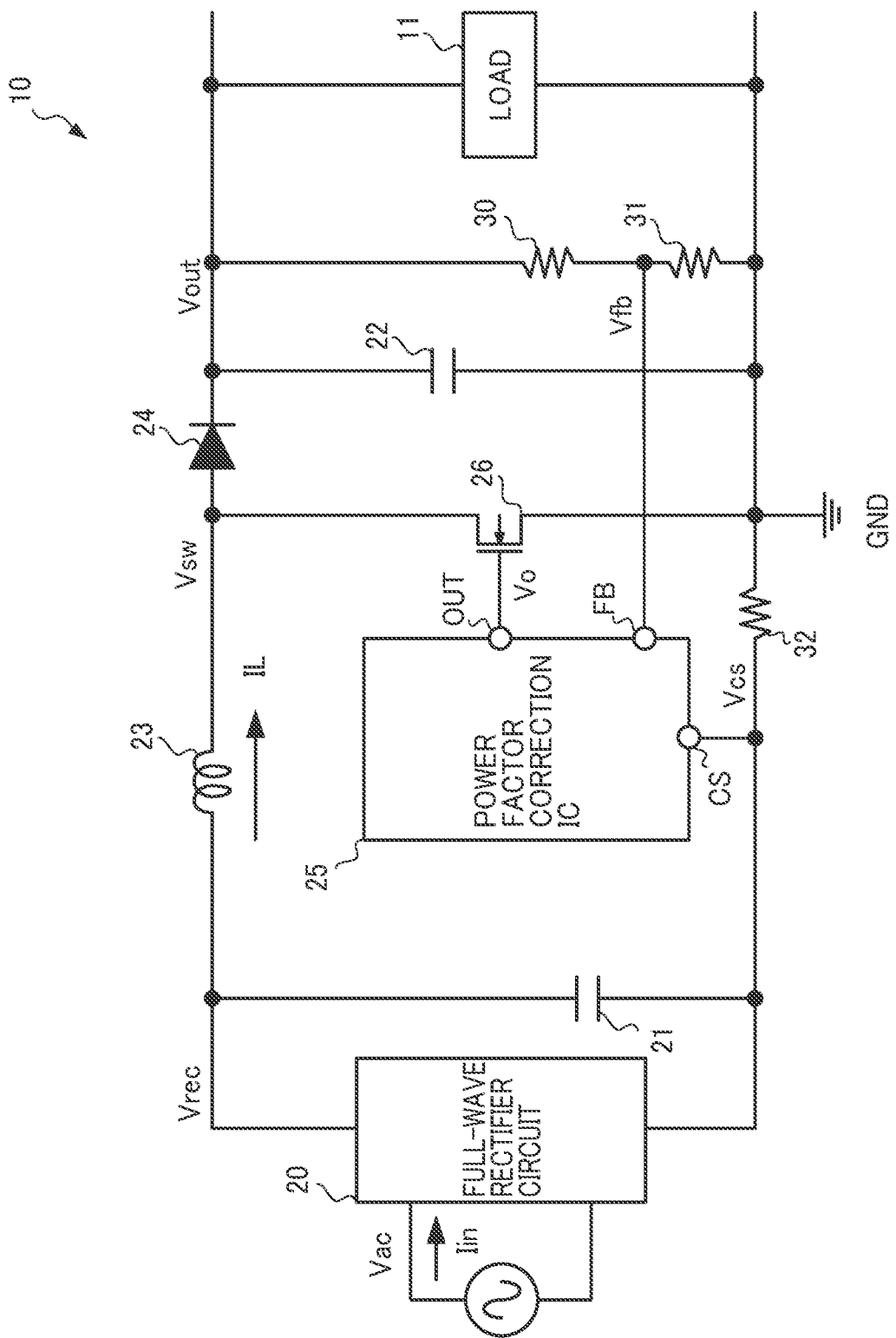
FIG. 1 is a diagram illustrating an example of an AC-DC converter 10.

FIG. 1 is a diagram illustrating a configuration of an AC-DC converter 10 according to an embodiment of the present disclosure.

The AC-DC converter 10 is a boost power factor correction (PFC) circuit that generates an output voltage Vout at a target level from an alternating-current (AC) voltage Vac of a commercial power supply.

The AC-DC converter 10 includes a full-wave rectifier circuit 20, capacitors 21 and 22, an inductor 23, a diode 24, a power factor correction IC 25, an N-channel metal-oxide-semiconductor (NMOS) transistor 26, and resistors 30 to 32. The AC-DC converter 10 corresponds to a "power supply circuit".

The full-wave rectifier circuit 20 full-wave rectifies a predetermined AC voltage Vac inputted thereto and outputs the rectified AC voltage Vac to the capacitor 21 and the inductor 23 as an input voltage Vrec. The AC voltage Vac is, for example, a voltage having an effective value in a range from 140 to 240 V and a frequency in a range from 50 to 60 Hz. Hereinafter, in an embodiment of the present disclosure, basically, a voltage is a potential difference with respect to a reference point (GND in FIG. 1); however, the AC voltage Vac indicates a voltage between terminals.

The capacitor 21 smooths the input voltage Vrec, and the capacitor 22, the inductor 23, the diode 24, and the NMOS transistor 26 configure a boost chopper circuit. Thus, a charging voltage of the capacitor 22 is the direct-current (DC) output voltage Vout.

The power factor correction IC 25 is an integrated circuit that controls switching of the NMOS transistor 26 such that a level of the output voltage Vout reaches a target level (for example, 400 V), while correcting an input power factor of the AC-DC converter 10. Specifically, the power factor correction IC 25 drives the NMOS transistor 26 based on an inductor current IL flowing through the inductor 23 and the output voltage Vout. The power factor correction IC 25 has terminals CS, FB, and OUT. Details of the power factor correction IC 25 will be described later. In an embodiment of the present disclosure, terminals other than the terminal CS and the like of the power factor correction IC 25 are omitted for the sake of convenience. The power factor correction IC 25 corresponds to a "switching control circuit".

The NMOS transistor 26 is a power transistor that controls power of the AC-DC converter 10 to a load 11. In an embodiment of the present disclosure, the NMOS transistor 26 is an N-type metal oxide semiconductor (MOS) transistor, however, it is not limited thereto, and another switching element such as a P-type MOS transistor or a bipolar transistor may be applicable, for example. A gate electrode of the NMOS transistor 26 is coupled to the terminal OUT.

The resistors 30 and 31 configure a voltage divider circuit that divides the output voltage Vout to thereby generate a feedback voltage Vfb that is used when the NMOS transistor 26 is switched. The feedback voltage Vfb generated at a node at which the resistors 30 and 31 are coupled is applied to the terminal FB.

The resistor 32 detects the inductor current IL, and has one end coupled to a source electrode of the NMOS transistor 26 and the other end coupled to the terminal CS.

<<<Power Factor Correction IC 25>>>

==Configuration of Power Factor Correction IC 25==

Figure 2:
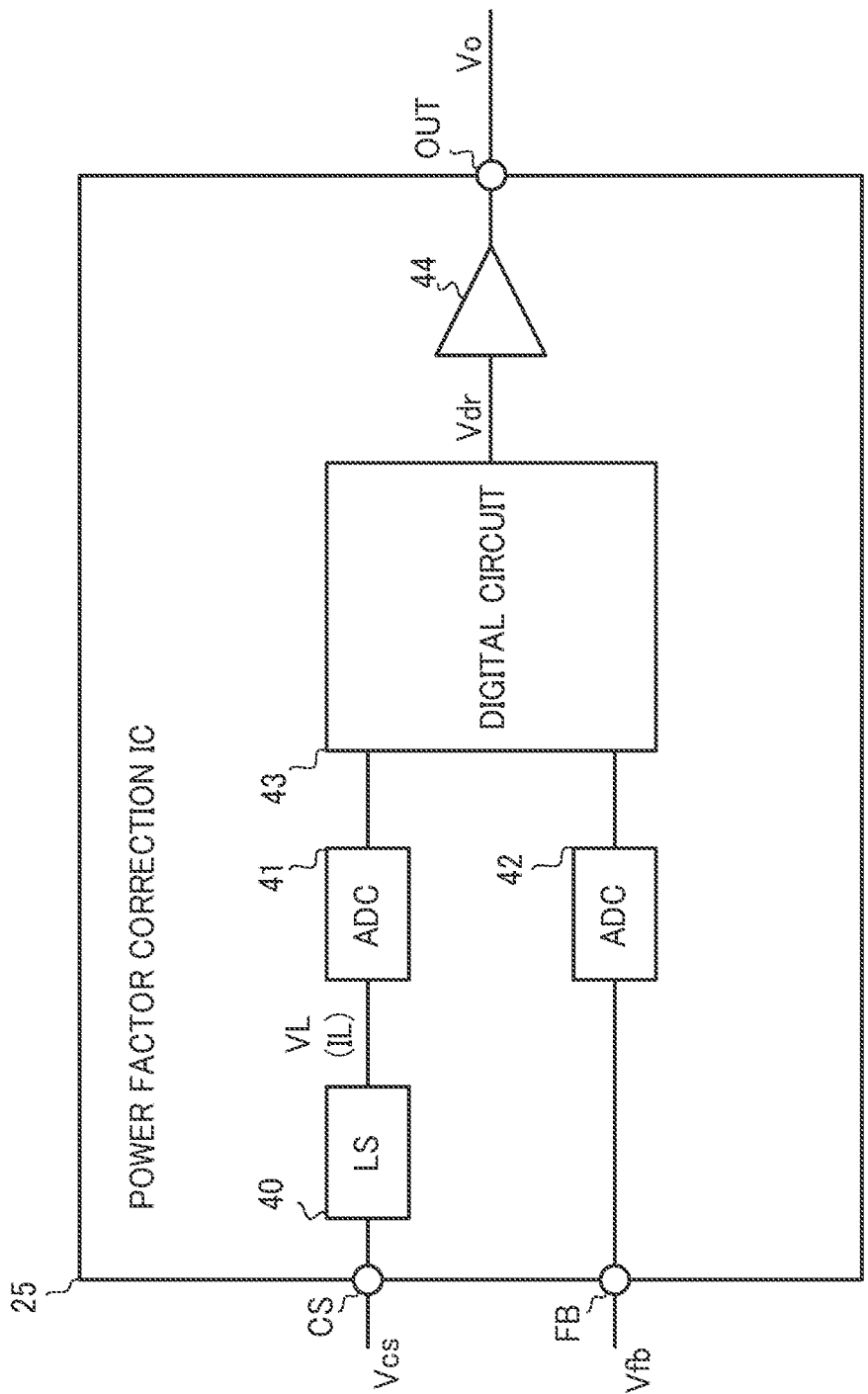
FIG. 2 is a diagram illustrating an example of a power factor correction IC 25.

FIG. 2 is a diagram illustrating an example of the power factor correction IC 25. The power factor correction IC 25 includes a level shifter circuit (LS) 40, AD converters (ADC: analog-to-digital converters) 41 and 42, a digital circuit 43, and a buffer circuit 44.

The level shifter circuit 40 shifts a level of a voltage Vcs corresponding to the inductor current IL to an appropriate level. Specifically, the level shifter circuit 40, for example, shifts the level of the voltage Vcs that changes around 0 V (zero volts) and outputs a resultant voltage as a voltage VL. The level shifter circuit 40 shifts the voltage Vcs such that the central level of the voltage VL is a predetermined level. The "predetermined level" herein is, for example, a level (2.5 V) that is a half of the level of a predetermined power supply voltage (for example, 5 V) generated in the power factor correction IC 25.

The level shifter circuit 40 includes a voltage divider circuit, a buffer circuit (or an inverting amplifier circuit), and the like that receive a power supply voltage on a high voltage side and receive the voltage Vcs on a low voltage side, for example. The level shifter circuit 40 changes the voltage VL with the same polarity as that of the inductor current IL. Thus, in an embodiment of the present disclosure, when the inductor current IL increases, the voltage VL increases as well.

The AD converter 41 converts the voltage VL into a digital value, and the AD converter 42 converts the feedback voltage Vfb into a digital value. As described above, the voltage VL is a voltage corresponding to the inductor current IL. Thus, hereinafter, in an embodiment of the present disclosure, the voltage VL converted into a digital value may be described as the inductor current IL for the sake of convenience. The AD converter 41 corresponds to a "second AD converter", and the AD converter 42 corresponds to a "first AD converter".

The digital circuit 43 outputs a driving signal Vdr to drive the NMOS transistor 26 based on the feedback voltage Vfb and the inductor current IL. The digital circuit 43 is a logic circuit of a wired logic-type that executes various types of computations, and includes a logic gate, a flip-flop, and a memory, for example. Note that the digital circuit 43 may be a digital signal processor (DSP) or a microcomputer. Details of the digital circuit 43 will be described later.

The buffer circuit 44 is a driver circuit that drives the NMOS transistor 26 in response to the driving signal Vdr. Specifically, the buffer circuit 44 turns on the NMOS transistor 26 in response to the driving signal Vdr reaching a high level (hereinafter, high or high level), and turns off the NMOS transistor 26 in response to the driving signal Vdr reaching a low level (hereinafter, low or low level).

==Digital Circuit 43a (Basic Configuration)==

Figure 3:
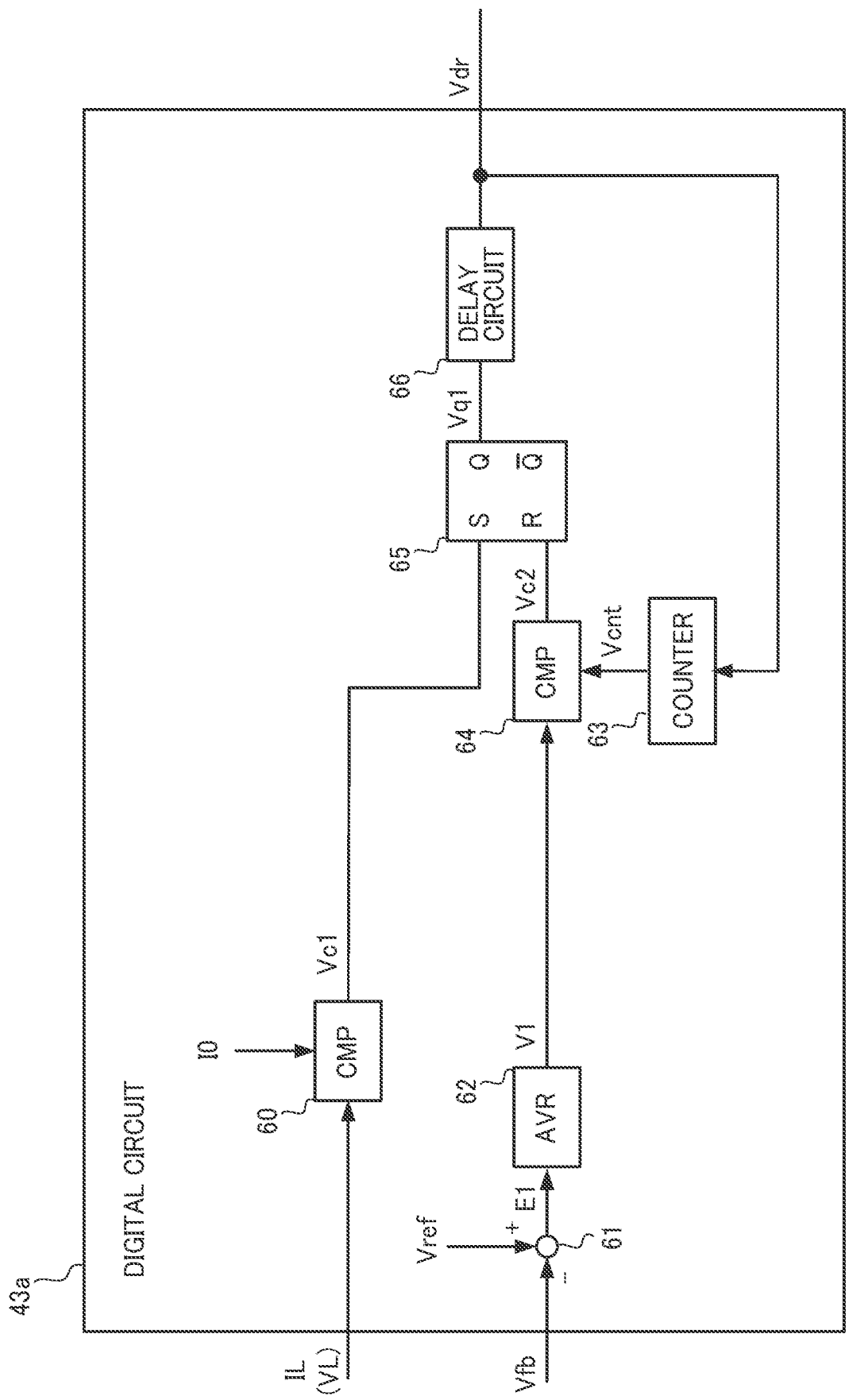
FIG. 3 is a diagram illustrating an example of a digital circuit 43*a*.

FIG. 3 is an example of a digital circuit 43a including a basic circuit for correcting a power factor.

A digital circuit 43b (described later) according to an embodiment of the present disclosure includes a circuit that limits a switching frequency and a circuit that corrects a command value. However, prior to the description of details of the digital circuit 43b, the basic configuration for correcting a power factor will be described here by using the digital circuit 43a in FIG. 3.

The digital circuit 43a includes comparator circuits 60 and 64, a subtractor circuit 61, an automatic voltage regulator (AVR) 62, a counter 63, an RS flip-flop 65, and a delay circuit 66. Hereinafter, descriptions will be given assuming that the inductor current IL as a digital value and the feedback voltage Vfb as a digital value are inputted to the digital circuit 43a.

The comparator circuit 60 compares the magnitudes between a current value of the inductor current IL and a predetermined current value I0 slightly larger than zero (for example, several mA), to thereby detect whether the inductor current IL is substantially zero (hereinafter, "substantially zero" is simply referred to as "0" (zero) as appropriate). When the current value of the inductor current IL is smaller than the current value I0 and the inductor current reaches zero, the comparator circuit 60 outputs a high signal Vc1. On the other hand, when the current value of the inductor current IL is larger than the current value I0, the comparator circuit 60 outputs a low signal Vc1. The current value I0 corresponds to a "predetermined value".

The subtractor circuit 61 subtracts the feedback voltage Vfb from a reference voltage Vref serving as a reference of the output voltage Vout at the target level (for example, 400 V), to calculate an error E1 between the reference voltage Vref and the feedback voltage Vfb.

The automatic voltage regulator 62 outputs, according to the error E1, a command value V1 to make the level of the feedback voltage Vfb equal to the level of the reference voltage Vref. The command value V1 corresponds to a "first command value", and the automatic voltage regulator 62 corresponds to a "first command value output circuit". The subtractor circuit 61 and the automatic voltage regulator 62 according to an embodiment of the present disclosure correspond to a so-called error amplifier circuit that performs amplification, integration, and/or the like of the error E1, for example.

The counter 63 is a circuit that outputs a signal Vcnt to determine a timing at which the NMOS transistor 26 is turned off and, in response to the driving signal Vdr going high, increments a count value from zero according to a clock signal (not illustrated). That is, in response to the driving signal Vdr going high, the counter 63 outputs a signal corresponding to a ramp wave in which a value of the signal Vcnt increases in proportion to an elapsed time.

The comparator circuit 64 compares the magnitudes between the command value V1 and the signal Vcnt. Specifically, when the signal Vcnt is larger than the command value V1, the comparator circuit 64 outputs a high signal Vc2, and when the signal Vcnt is smaller than the command value V1, the comparator circuit 64 outputs a low signal Vc2.

The signal Vc1 is inputted to an S input of the RS flip-flop 65, and the signal Vc2 is inputted to an R input thereof. Thus, in response to the signal Vc1 going high, a signal Vq1, which is a Q output of the RS flip-flop 65, goes high. On the other hand, in response to the signal Vc2 going high, the signal Vq1 goes low.

The delay circuit 66 delays the signal Vq1 by a predetermined time period, and outputs a resultant signal as the driving signal Vdr. The "predetermined time period" is set to be longer than a time period from a timing at which the NMOS transistor 26 is turned off and the inductor current IL decreases to zero to when a parasitic capacitance between the drain and source of the NMOS transistor 26 is discharged such that the voltage thereof drops, for example. The timing at which the inductor current IL reaches zero is a timing in principle at which the NMOS transistor 26 is turned on next in the critical mode operation.

Thus, in an embodiment of the present disclosure, it is possible to prevent the NMOS transistor 26 from being turned on in a state in which the drain-source voltage of the NMOS transistor 26 is large. This indicates that an embodiment of the present disclosure employs a technique of preventing a switching loss by utilizing the occurrence of the LC resonance between the inductor 23 and the parasitic capacitance of the NMOS transistor 26 after the inductor current IL reaches zero.

==Operation of Digital Circuit 43a==

Figure 4:
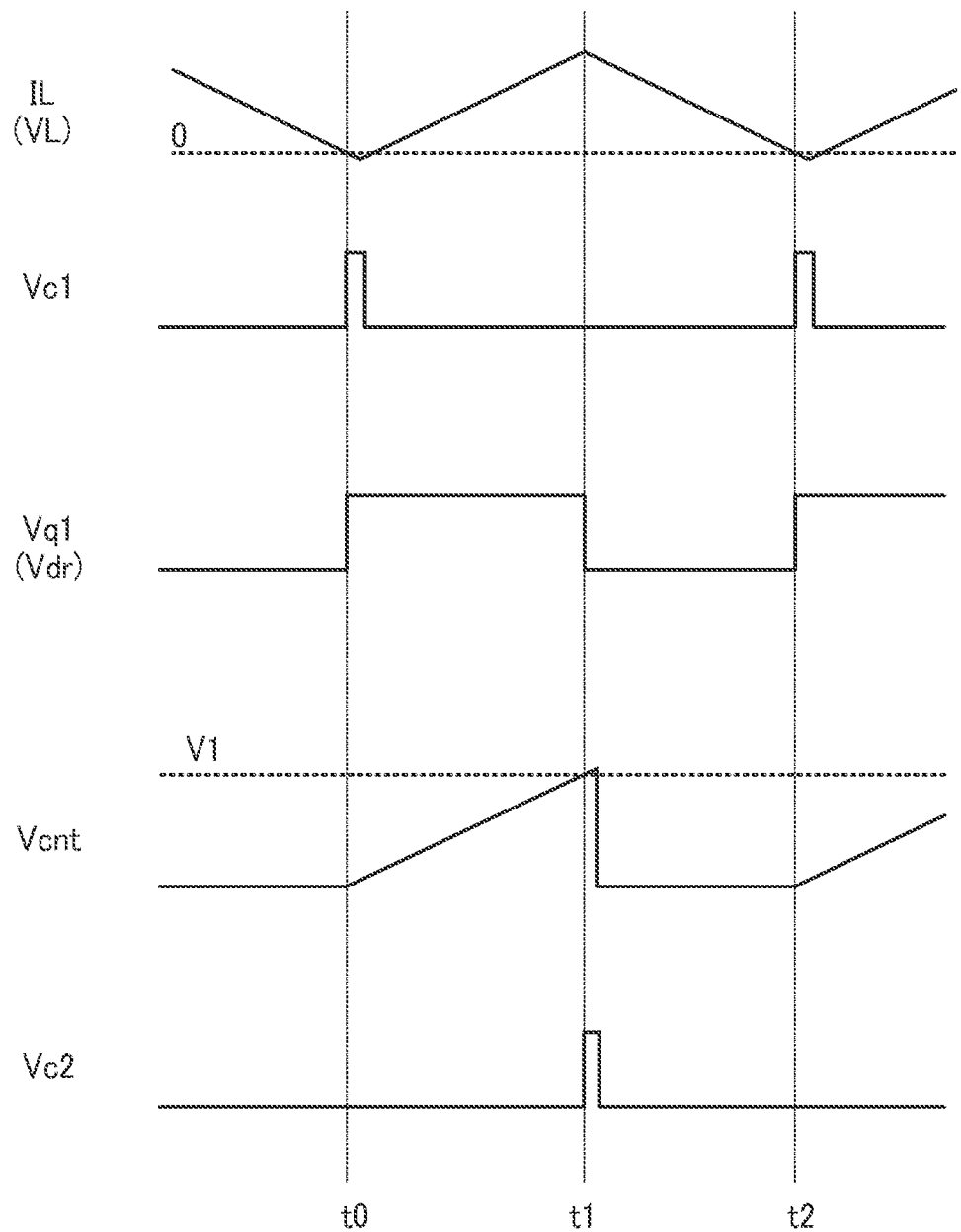
FIG. 4 is a diagram illustrating main waveforms of a digital circuit 43*a*.

With reference to FIG. 4, a description will be given of an operation of the digital circuit 43a, when the AC-DC converter 10 generates the output voltage Vout at the target level from a predetermined AC voltage Vac inputted thereto and supplies power to a constant load.

First, in response to the inductor current IL decreasing to the current value I0 at time t0, the comparator circuit 60 changes the signal Vc1 to high. In response to the signal Vc1 going high, the RS flip-flop 65 outputs the high signal Vq1. As a result, the driving signal Vdr outputted from the delay circuit 66 also goes high.

In response to the driving signal Vdr going high, the NMOS transistor 26 is turned on, and thus the inductor current IL increases. Here, for the sake of convenience, a predetermined time period by which the delay circuit 66 delays the signal Vq1 is omitted since it is short.

In response to the driving signal Vdr going high, the count value of the counter 63 is incremented, and thus the signal Vcnt also increases. Then, in response to the level of the signal Vcnt exceeding the level of the command value V1 at time t1, the comparator circuit 64 changes the signal Vc2 to high. As a result, the RS flip-flop 65 is reset, and the signal Vq1 goes low.

In response to the signal Vq1 going low, the driving signal Vdr also goes low, and thus the NMOS transistor 26 is turned off. As a result, the inductor current IL gradually decreases. In response to the inductor current IL decreasing to zero at time t2, the operation at time t0 is repeated.

In this process, while the AC-DC converter 10 is generating the output voltage Vout at the target level from a predetermined AC voltage Vac inputted thereto, the capacitance of the capacitor 22 is sufficiently large, and the feedback voltage Vfb becomes substantially constant within a time period of about one cycle of the AC voltage Vac. As a result, the command value V1 outputted from the automatic voltage regulator 62 is substantially constant as well, and thus a time period during which the NMOS transistor 26 is on (for example, a time period from time t0 to t1) is also substantially constant.

In response to rise in the level of the voltage Vrec obtained by rectifying the AC voltage Vac when the NMOS transistor 26 is turned on, the current value of the inductor current IL also increases. As a result, as illustrated in FIG. 5, the waveform of the peak value of the inductor current IL is similar to that of the voltage Vrec.

==Inductor Current IL==
<<Typical Waveform>>

Figure 5:
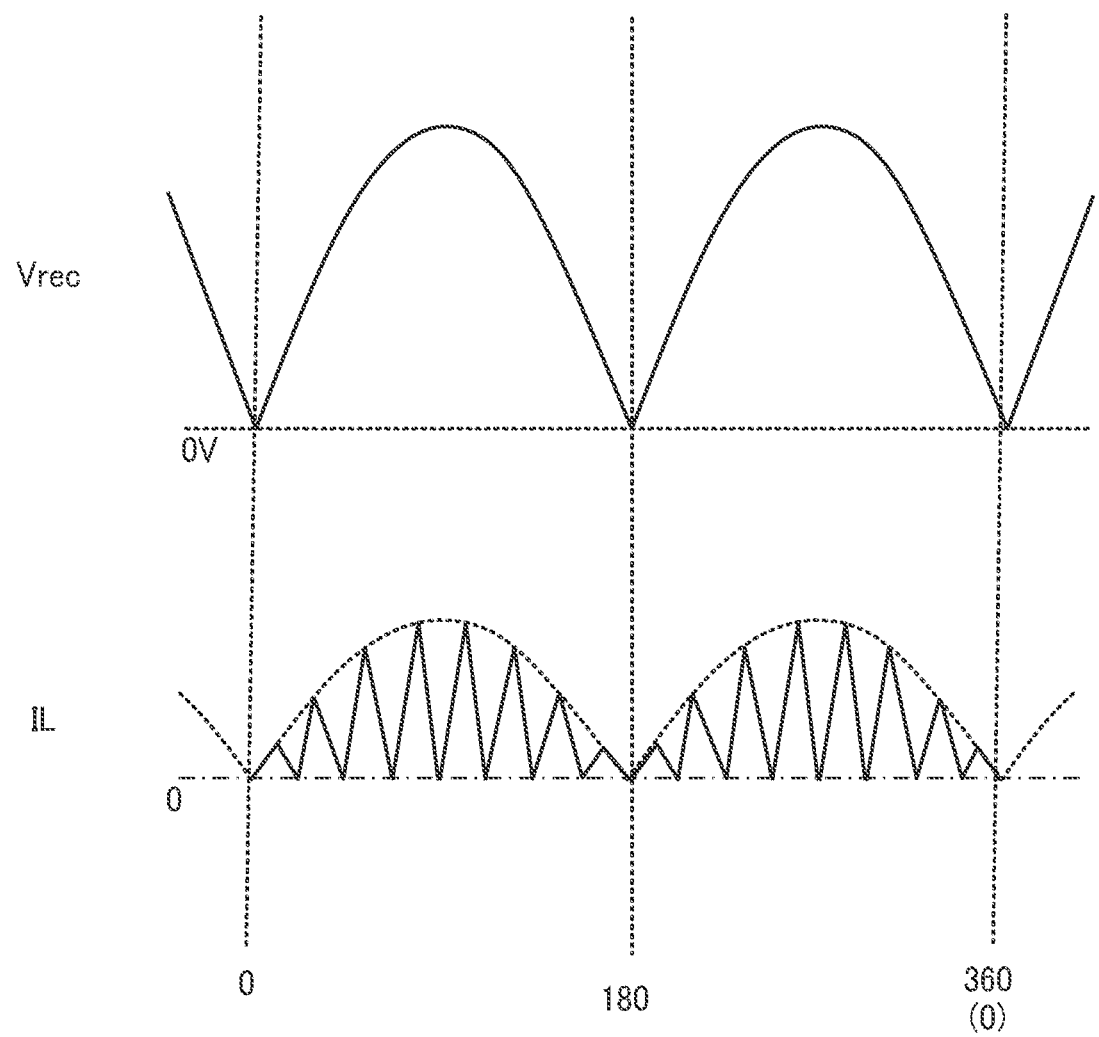
FIG. 5 is a diagram for explaining main waveforms of an AC-DC converter 10.
Figure 6:
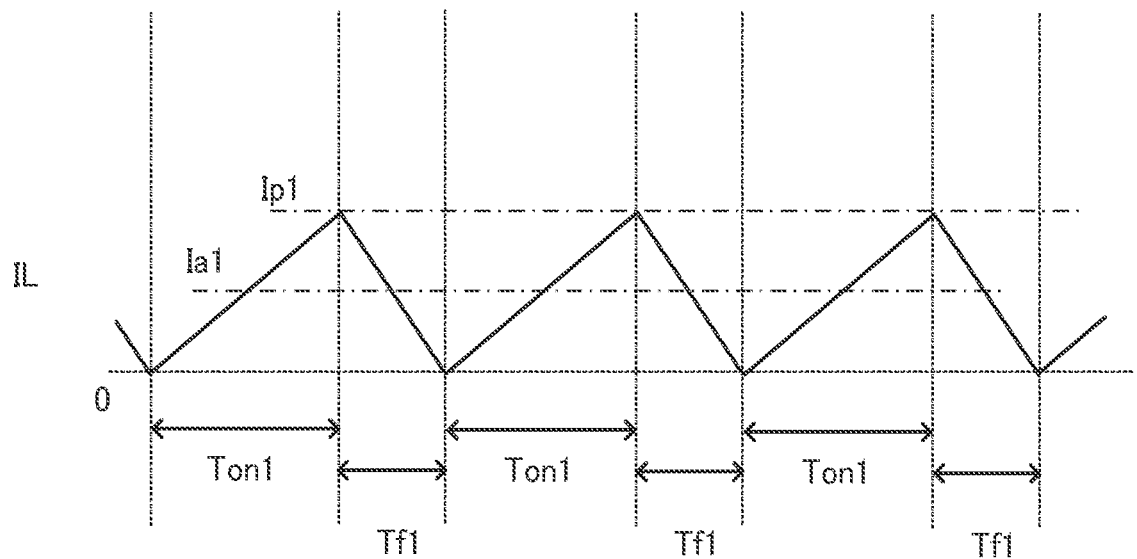
FIG. 6 is a diagram for explaining an inductor current IL.

FIG. 6 is a diagram for explaining details of the inductor current IL in FIG. 5. Here, the peak value Ip1 of the inductor current IL is given by an expression (1):

$$Ip1 = (Vrec/L) \times Ton1 \tag{1}$$

where Ip1 is the peak value of the inductor current IL, Ton1 is a time period during which the NMOS transistor 26 is on, and L is an inductance of the inductor 23.

A time period Tf1 during which the NMOS transistor 26 is off and the inductor current IL decreases is given by an expression (2):

$$Tf1 = (L \times Ip1)/(Vout - Vrec) = (Vrec/(Vout - Vrec)) \times Ton1. \quad (2)$$

In FIG. 6, an average value Ia1 of the inductor current IL is given by an expression (3):

$$Ia2 = Ip1/2 = (Vrec \times Ton1)/(2 \times L) \quad (3).$$

Here, in FIG. 5, around a low phase angle (for example, phase angle 0° (or 180°)), the peak value Ip1 is also low. Additionally, around the low phase angle, the value of the input voltage Vrec is also low, and thus, the time period Tf decreases. Accordingly, in this region, even if the time period Ton1 is constant, a cycle of the driving signal Vdr (the time period Ton1+the time period Tf) decreases, and the switching frequency rises.

In response to rising in the switching frequency, the power consumption in the NMOS transistor 26 and the inductor 23 increases, and thus the rise in the switching frequency needs to be limited to prevent the switching frequency from rising more than necessary. In an embodiment of the present disclosure, "to limit the switching frequency" means to prevent the switching frequency (that is, the frequency of the driving signal Vdr) from reaching a predetermined frequency or higher.

<<When Switching Frequency is Limited>>

Figure 7:
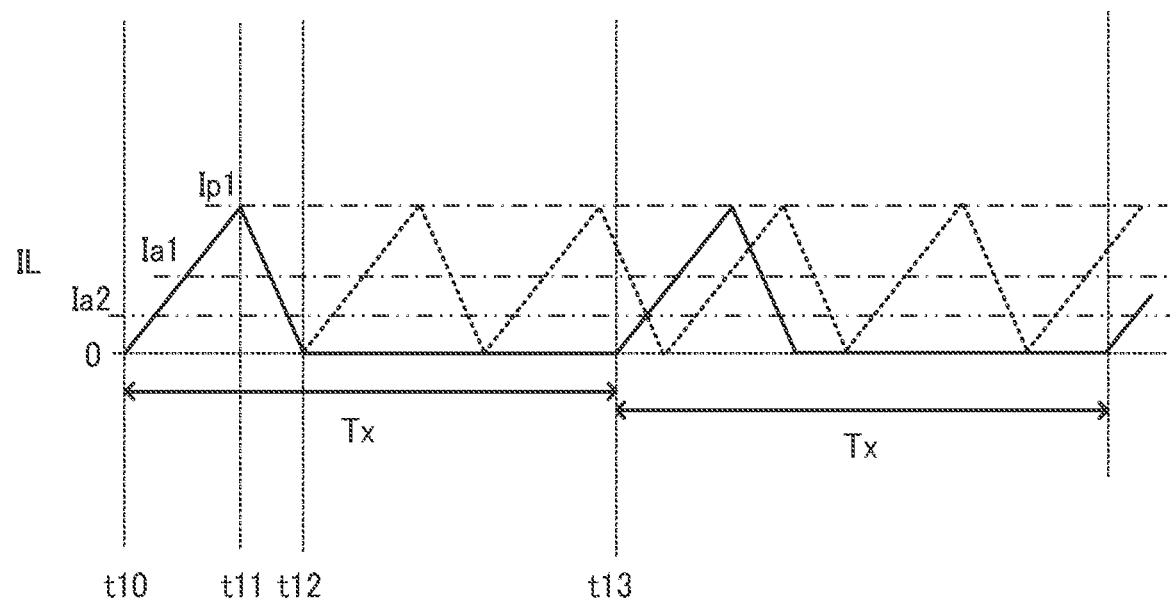
FIG. 7 is a diagram for explaining an inductor current IL.

FIG. 7 is a diagram for explaining the inductor current IL when the switching frequency is limited. In FIG. 7, the dotted line is an example of the inductor current IL when the frequency is not limited, and the solid line is an example of the inductor current IL when the frequency is limited. It is assumed here that the frequency is limited such that the cycle of the driving signal Vdr is not shorter than a time period Tx. Further, a waveform when the switching frequency is limited is mainly described here, and details of a circuit configuration for limiting the switching frequency will be described later.

First, for example, when the NMOS transistor 26 is on from time t10 to time t11, the inductor current IL increases. In response to turning off of the NMOS transistor 26 at time t11, the inductor current IL decreases, and the inductor current IL reaches zero at time t12.

When the switching frequency is not limited, the inductor current IL increases again after reaching zero, as indicated by the dotted line. However, when the switching frequency is limited, the NMOS transistor 26 is not turned on until time t13 at which the time period Tx has elapsed since time t10. Thus, from time t12 to time t13, the inductor current IL is zero, as indicated by the solid line. As a result, when the switching frequency is limited, the average value Ia2 (dashed two dotted line) in a switching cycle of the inductor current IL (solid line) is smaller than the average value Ia1 (dashed-dotted line) in a switching cycle of the inductor current IL (dotted line).

Accordingly, when the switching frequency is limited, it is possible to reduce the power consumption in the NMOS transistor 26 and the inductor 23, however, the average value Ia2 in the switching cycle of the inductor current IL decreases and the waveform thereof deviates from a rectified waveform of the AC voltage, and thus the power factor deteriorates.

<<Method of Increasing Average Value Ia2>>

Figure 8:
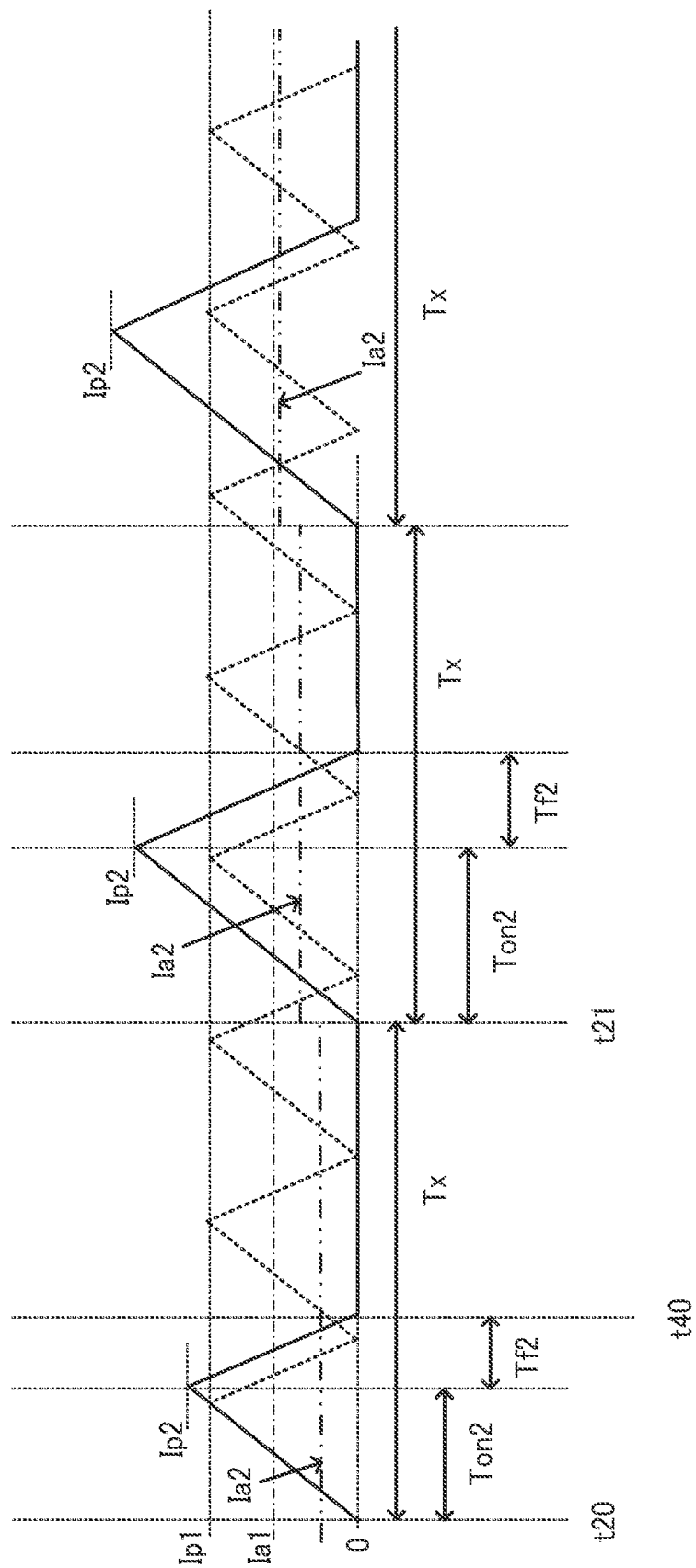
FIG. 8 is a diagram for explaining an inductor current IL.

In order to increase the average value Ia2 when the switching frequency is limited, for example, a peak value Ip2 of the inductor current IL (solid line) may be increased larger than the peak value Ip1 of the inductor current IL (dotted line). FIG. 8 is a diagram for explaining a waveform of the inductor current IL whose peak value Ip2 is increased. A description will be mainly given here of the inductor current IL (solid line) when the switching frequency is limited.

The peak value Ip2 of the inductor current IL (solid line) is given by an expression (4):

$$Ip2 = (Vrec/L) \times Ton2 \quad (4)$$

where Ton2 is an on time period during which the NMOS transistor 26 is on.

The time period Tf2 from when the NMOS transistor 26 is turned off to when the inductor current IL (solid line) reaches zero is given by an expression (5):

$$Tf2 = (L \times Ip2)/(Vout - Vrec) = (Vrec/(Vout - Vrec)) \times Ton2. \quad (5)$$

The average value Ia2 of the inductor current IL (solid line) is given by an expression (6):

$$Ia2 = (Ip2/2) \times ((Ton2 + Tf2)/Tx) \quad (6).$$

Then, substituting the peak value Ip2 of the expression (4) and the time period Tf2 of the expression (5) into the expression (6) yields an expression (7) as follows:

$$Ia2 = (Vrec \times Vout \times (Ton2)_2)/(2 \times L \times Tx \times (Vout - Vrec)) \quad (7).$$

As can be seen from the expression (7), in order to increase the average value Ia2 and correct the power factor, the on time period Ton2 may increase. Here, how much the on time period Ton2 increases is calculated by using an average value of a "conductivity C" indicating the proportion of the flowing inductor current IL (solid line) in the time period Tx. The average value of the conductivity C is obtained by adding up the conductivities of respective switching cycles (that is, each conductivity of each cycle) for several cycles (for example, two to ten cycles) and dividing the result of the addition by the several cycles for which the result is obtained.

Here, in an embodiment of the present disclosure, the average value of the conductivity C is given by an expression (8) below. Hereinafter, unless stated otherwise, the average value of the conductivity C is simply referred to as the "conductivity C":

$$C = (Ton2 + Tf2)/Tx \quad (8).$$

For example, when the on time period Ton2 from time t20 in FIG. 8 is relatively short, the on time period Ton1 is multiplied by the reciprocal of the conductivity C, to thereby calculate the next on time period Ton2 (see an expression (9)). In this case, the next on time period Ton2 is a time period from time t21, for example:

$$Ton2 = Ton1 \times (1/C) \quad (9).$$

The conduction rate C is a value that increases when the on time period Ton2 is short, and that decreases when the on time period Ton2 is long. Accordingly, when the on time period Ton2 increases by repeatedly calculating the expression (9), the on time period Ton2 will converge to a certain value.

In response to the time period Ton2 having converged, an expression (10) below is established:

$$Ton2 = Ton1 \times (1/C)$$
$$= Ton1 \times ((Ton2 + Tf2)/Tx) \quad (10)$$

Substituting the time period Tf2 of the expression (5) into the expression (10) for rearrangement yields an expression (11):

$$(Ton2)2=(Ton1 \times Tx \times (Vout-Vrec))/Vout \quad (11)$$

Then, when the expression (11) is substituted into the right side of the expression (7) for rearrangement, the average value Ia2 is given by an expression (12):

$$Ia2=(Vrec \times Ton1)/(2 \times L) \quad (12)$$

The right side of the expression (12) is the average value Ia1 of the inductor current IL given by the expression (3). Accordingly, when the expression (9) is repeated such that the on time period Ton2 changes according to the reciprocal of the conduction rate C, the on time period Ton2 will converge. Additionally, in this case, irrespective of the levels of the input voltage Vrec and the output voltage Vout, the average value Ia2 is equal to the average value Ia1, and thus, the power factor is corrected. In an embodiment of the present disclosure, a circuit implementing such a principle is used, to thereby correct the power factor of the AC-DC converter 10.

==Digital Circuit 43b==

Figure 9:
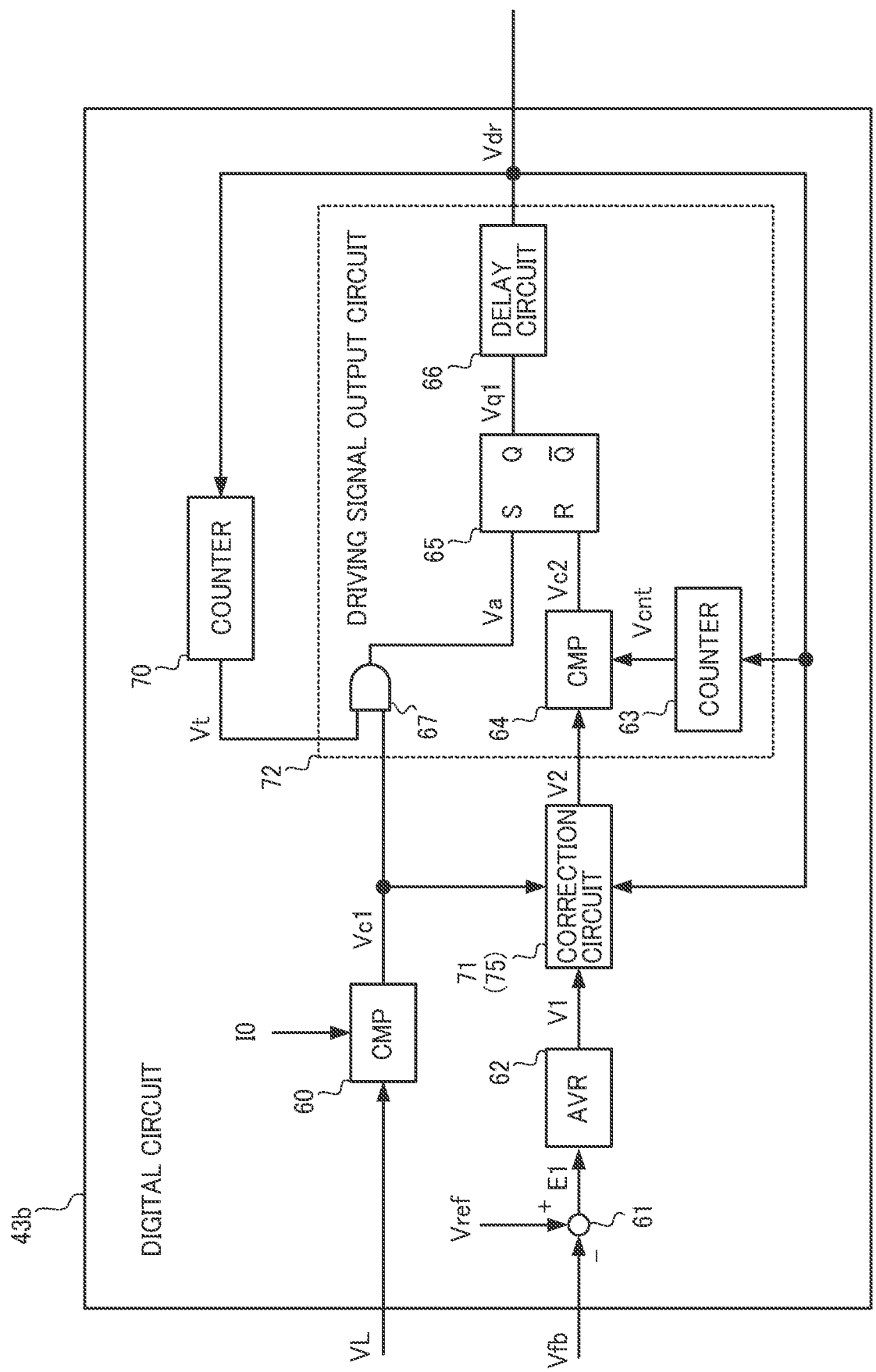
FIG. 9 is a diagram illustrating an example of a digital circuit 43*b*.

FIG. 9 is a diagram illustrating an example of a configuration of the digital circuit 43b that is capable of implementing the principle to make the average value Ia2 the average value Ia1. The digital circuit 43b includes the comparator circuit 60, the subtractor circuit 61, the automatic voltage regulator (AVR) 62, a counter 70, a correction circuit 71, and a driving signal output circuit 72. The blocks given the same reference numerals between FIGS. 3 and 9 are the same. Thus, a description will be mainly given of the counter 70, the correction circuit 71, and the driving signal output circuit 72.

The counter 70 is a time counter that measures the time period Tx corresponding to the upper limit of the switching frequency from a timing at which the driving signal Vdr goes high (hereinafter, referred to as a "timing ta"). Specifically, before the time period Tx has elapsed since the timing ta, the counter 70 outputs a low signal Vt, and in response to the time period Tx having elapsed since the timing ta, the counter 70 outputs a high signal Vt. The timing ta corresponds to a "timing at which the NMOS transistor 26 is turned on (first timing)", the counter 70 corresponds to a "first timer circuit", and the time period Tx corresponds to a "first time period".

The correction circuit 71 corrects the command value V1 such that the on time period Ton of the NMOS transistor 26 increases, when the switching frequency is limited, and outputs a resultant value as the command value V2. Details of the correction circuit 71 will be described later.

The driving signal output circuit 72 outputs the driving signal Vdr, based on the signal Vc1 from the comparator circuit 60, the signal Vt from the counter 70, and the command value V2. Specifically, in response to the inductor current IL reaching zero and the predetermined time period Tx having elapsed since the timing ta, the driving signal output circuit 72 outputs the high driving signal Vdr. In response to the on time period Ton reaching a time period determined by the command value V2, the driving signal output circuit 72 outputs the low driving signal Vdr.

The driving signal output circuit 72 includes the counter 63, the comparator circuit 64, the RS flip-flop 65, the delay circuit 66, and an AND circuit 67. As described above, the circuits given the same reference numerals between FIGS. 3 and 9 are the same. Thus, a description will be mainly given of the comparator circuit 64 that receives the command value V2 and the AND circuit 67.

The comparator circuit 64 compares the magnitudes between the command value V2 and the signal Vcnt. Specifically, when the signal Vcnt is larger than the command value V2, the comparator circuit 64 outputs the high signal Vc2, and when the signal Vcnt is smaller than the command value V2, the comparator circuit 64 outputs the low signal Vc2.

The AND circuit 67 computes a logical product of the signal Vc1 from the comparator circuit 60 and the signal Vt from the counter 70, to output the result as a signal Va. Accordingly, the AND circuit 67 outputs the high signal Va only when it is determined that the inductor current IL is zero (it does not matter whether exactly zero is maintained thereafter) and also the time period Tx or more has elapsed since the timing ta. Thus, the driving signal output circuit 72 does not output the driving signal Vdr having a switching cycle shorter than the time period Tx. That is, the driving signal output circuit 72 limits the frequency of the driving signal Vdr.

The driving signal output circuit 72 outputs the low driving signal Vdr at a timing at which the signal Vcnt of the counter 63 reaches the command value V2 and the comparator circuit 64 outputs the high signal Vc2. Thus, the on time period Ton of the NMOS transistor 26 changes according to the level of the command value V2 outputted from the correction circuit 71. Hereinafter, details of the correction circuit 71 that outputs the command value V2 will be described.

<<Configuration of Correction Circuit 71>>

Figure 10:
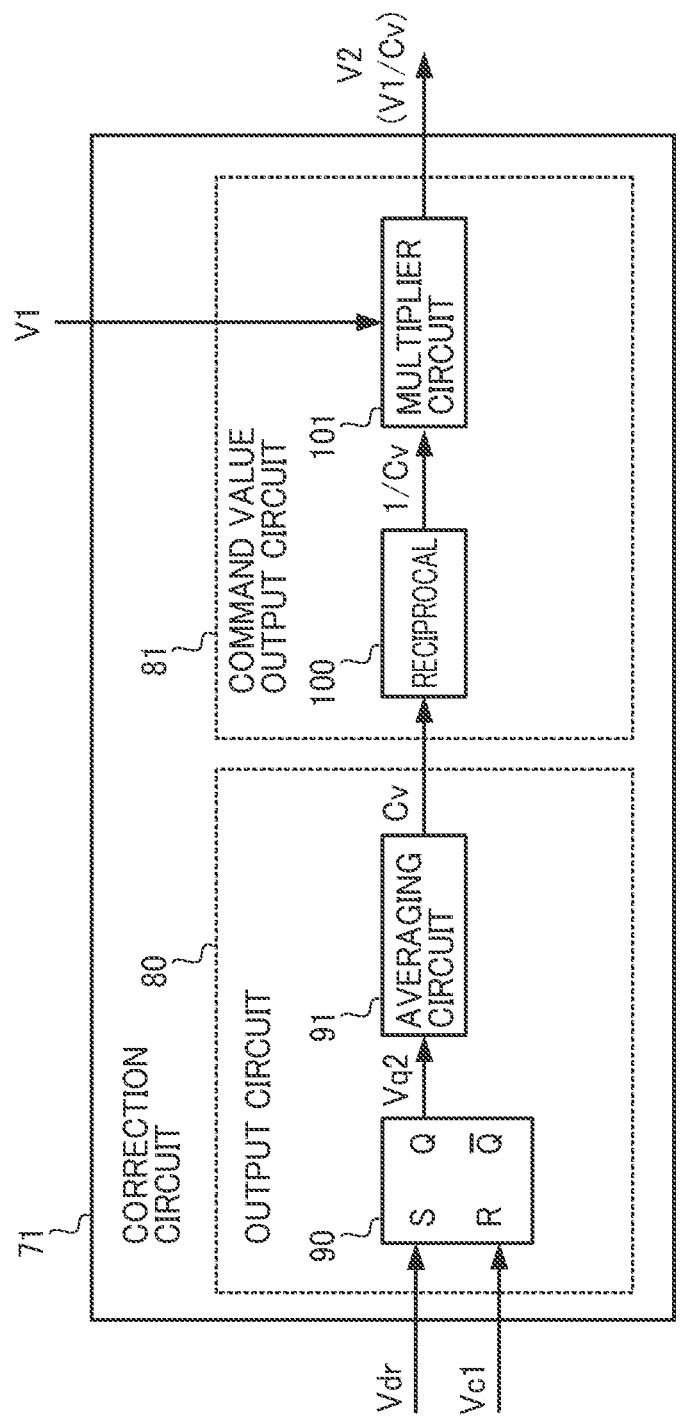
FIG. 10 is a diagram illustrating an example of a correction circuit 71.

FIG. 10 is a diagram illustrating an example of the correction circuit 71. The correction circuit 71 corrects the on time period Ton based on the principle explained in FIG. 8, and includes an output circuit 80 and a command value output circuit 81.

==Configuration of Output Circuit 80==

The output circuit 80 outputs a value Cv representing the conductivity C that indicates the proportion of a time period during which the inductor current IL is flowing in the switching cycle. Thus, for example, when the switching cycle is the time period Tx, the output circuit 80 outputs the value Cv indicating the calculation result of the expression (8). The output circuit 80 includes an RS flip-flop 90 and an averaging circuit 91.

The RS flip-flop 90 is a circuit that measures a time period during which the inductor current IL is flowing in the switching cycle. Specifically, the RS flip-flop 90 outputs the high signal Vq2 based on the timing to at which the driving signal Vdr goes high. On the other hand, the RS flip-flop 90 outputs the low signal Vq2 based on a timing tb at which the inductor current IL reaches zero and the signal Vc1 goes high. Accordingly, the time period during which the signal Vq2 is high is the time period during which the inductor current IL is flowing (a time period during which the inductor current IL is larger than zero).

The RS flip-flop 90 corresponds to a "signal output circuit", and the timing tb corresponds to a "second timing". The high signal Vq2 corresponds to a "signal at a first level", and the low signal Vq2 corresponds to a "signal at a second level". The "time period during which the inductor current IL is flowing" is a time period during which the inductor current IL is larger than zero (a time period during which the signal Vq2 is high) and corresponds to a "second time period".

The averaging circuit 91 obtains the average value of the conductivity C by computing the above-described expression (8). Specifically, the averaging circuit 91 obtains the signals Vq2 indicating the time period during which the inductor current IL is flowing for several cycles (for example, two cycles), and outputs the value Cv indicating the average value of the conductivity C. Thus, when the time period during which the inductor current IL is flowing increases and the conductivity C increases, the value Cv also increases. It is assumed here that the averaging circuit 91 obtains and averages signals Vq2 for the several cycles (for example, two cycles), however, it is not limited thereto, and a so-called low-pass filter may be applicable. The low-pass filter results in averaging the signals Vq2 for cycles more than the several cycles, and thus the low-pass filter operates as an averaging circuit.

As illustrated, for example, in FIG. 8, in the critical mode in which the NMOS transistor 26 is turned on immediately in response to the inductor current IL reaching zero and the inductor current IL starts increasing, the conductivity C results in substantially 100%. In an embodiment of the present disclosure, when the conductivity C is 0%, the value Cv is 0 (zero), and when the conductivity C is 100%, the value Cv is 1. That is, the value Cv is a value representing the conductivity C, which changes in a range from 0 to 100%, in a range from 0 to 1.

==Configuration of Command Value Output Circuit 81==

The command value output circuit 81 corrects the command value V1 from the automatic voltage regulator (AVR) 62 in FIG. 9 by an amount of correction that decreases with an increase in the conductivity C, and outputs a resultant value as the command value V2.

Specifically, the command value output circuit 81 computes the above-described expression (9):

$$Ton2 = Ton1 \times (1/C) \quad (9).$$

The value of the conductivity C for one cycle may greatly change every cycle. Thus, for instance, when the conductivity C for one cycle is used in the expression (9), the on time period Ton2 may greatly vary without converging. However, as described above, C in the expression (9) is the average value of the conductivity of several cycles. Accordingly, in an embodiment of the present disclosure, it is possible to prevent the on time period Ton2 from greatly varying every cycle, thereby being able to converge to the time period indicated in the expression (10).

The on time period Ton1 herein is a time period determined based on the command value V1, and the on time period Ton2 is a time period determined based on the command value V2. The command value output circuit 81 includes an arithmetic circuit 100 and a multiplier circuit 101. The command value V2 corresponds to a "second command value", and the command value output circuit 81 corresponds to a "second command value output circuit".

The arithmetic circuit 100 computes a reciprocal (1/Cv) of the value Cv representing the conductivity C.

Accordingly, in an embodiment of the present disclosure, when the conductivity C increases, the reciprocal decreases.

The multiplier circuit 101 multiplies the computed reciprocal (1/Cv) by the command value V1, to outputs the command value V2 (=V1× (1/Cv)).

<<<Operation of Digital Circuit 43b>>>

In the digital circuit 43b in FIG. 9, after the timing to at which the NMOS transistor 26 is turned on, there are a case where the inductor current IL reaches zero after a lapse of the time period Tx, and a case where the inductor current IL reaches zero before a lapse of the time period Tx. The case where the inductor current IL reaches zero after a lapse of the time period Tx is a state in which the AC-DC converter 10 operates in a so-called critical mode. On the other hand, the case where the inductor current IL reaches zero before a lapse of the time period Tx is a state in which the AC-DC converter 10 operates in a mode in which the switching frequency of the AC-DC converter 10 is limited.

The digital circuit 43b according to an embodiment of the present disclosure operates in two different modes (the critical mode and the frequency limitation mode) based on the timing at which the inductor current IL reaches zero. Accordingly, each of the operation modes will be described here.

==Case where Inductor Current IL Reaches Zero after Lapse of Time Period Tx==

Figure 11:
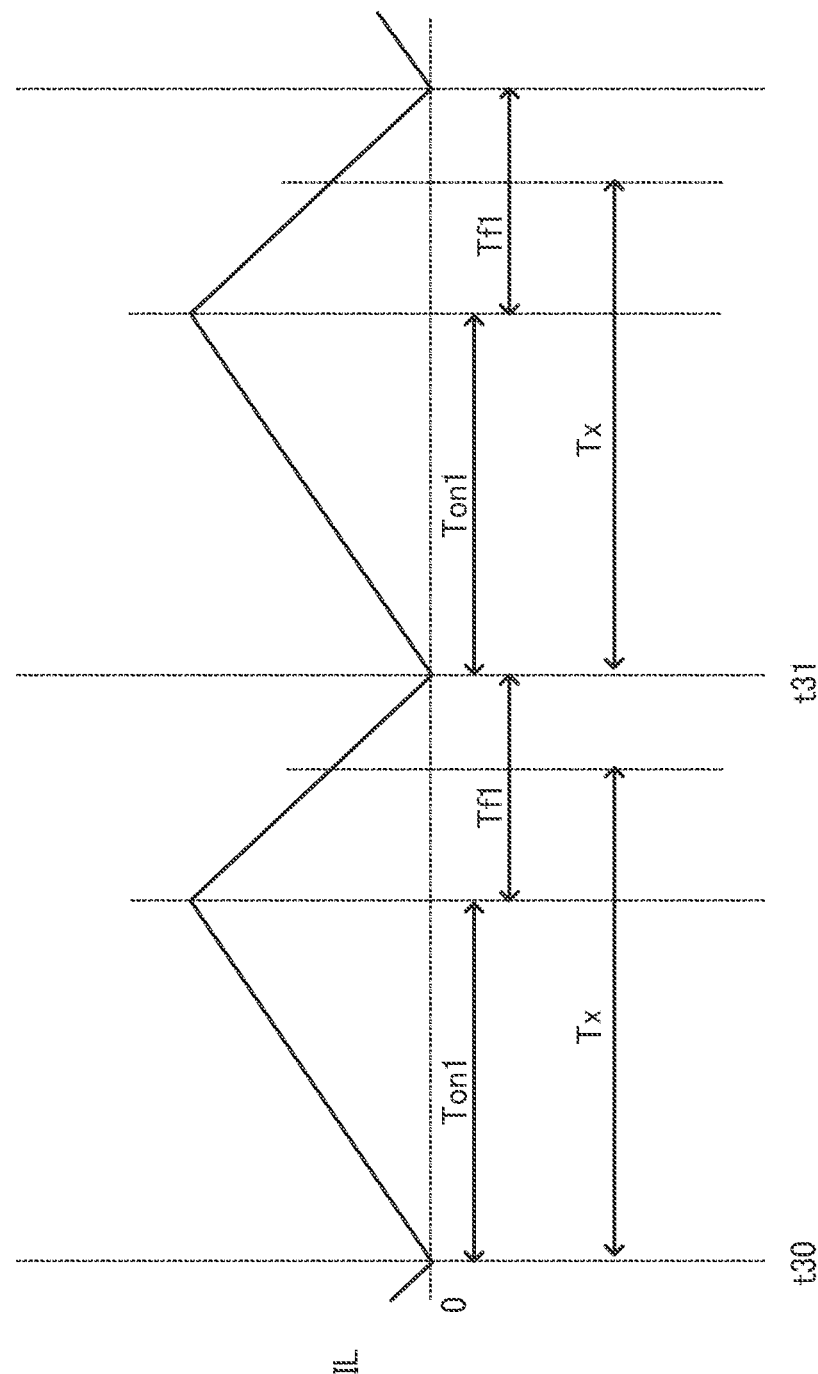
FIG. 11 is a diagram for explaining an inductor current IL.

For example, in the inductor current IL illustrated in FIG. 11, the inductor current IL reaches zero at time t31 after the time period Tx has elapsed since time t30 at which the NMOS transistor 26 is turned on. In such a critical mode, the AND circuit in FIG. 9 causes the signal Va to go high at a timing at which the signal Vo1 goes high. Then, in response to the signal Va going high, the signal Vq1 and the driving signal Vdr also go high.

As a result, the high driving signal Vdr is inputted to the RS flip-flop 90 at a timing immediately after the signal Vo1 goes high. Accordingly, the RS flip-flop 90 outputs the signal Vq2 substantially at the high level, and thus the value Cv representing the conductivity C is substantially 1.

In such a case, the command value V2 outputted from the command value output circuit 81 is substantially equal to the command value V1. Thus, when the operation is performed in the critical mode, the correction circuit 71 in FIG. 9 outputs the command value V1 substantially as it is, and the AND circuit 67 outputs the signal Vc1 as the signal Va. As a result, the digital circuit 43b operates substantially similarly to the digital circuit 43a illustrated in FIG. 3.

==Case Where Inductor Current IL Reaches Zero Before Lapse of Time Period Tx==

For example, the inductor current IL indicated by the solid line in FIG. 8 reaches zero at time t40, which is before the time period Tx has elapsed since time t20 at which the NMOS transistor 26 is turned on. In such a frequency limitation mode, the AND circuit in FIG. 9 causes the signal Va to go high at a timing at which the signal Vt goes high.

In this case, the correction circuit 71 multiplies the command value V1 by the reciprocal of the value Cv representing the conductivity C, and outputs a resultant value as the command value V2 (=V1/Cv). Then, in an embodiment of the present disclosure, the conductivity C is updated every switching cycle. As a result, in the digital circuit 43b, the expression (9) is executed repeatedly, and thus the conductivity C (the value Cv) converges, and the average value of the inductor currents IL in the frequency limitation mode is equal to the average value of the inductor currents IL in the critical mode. Accordingly, in an embodiment of the present disclosure, even in a case where the frequency is limited, it is possible to prevent the average value of the inductor currents IL from decreasing, thereby correcting the power factor.

<<<Simulation Results>>>

Figure 12:
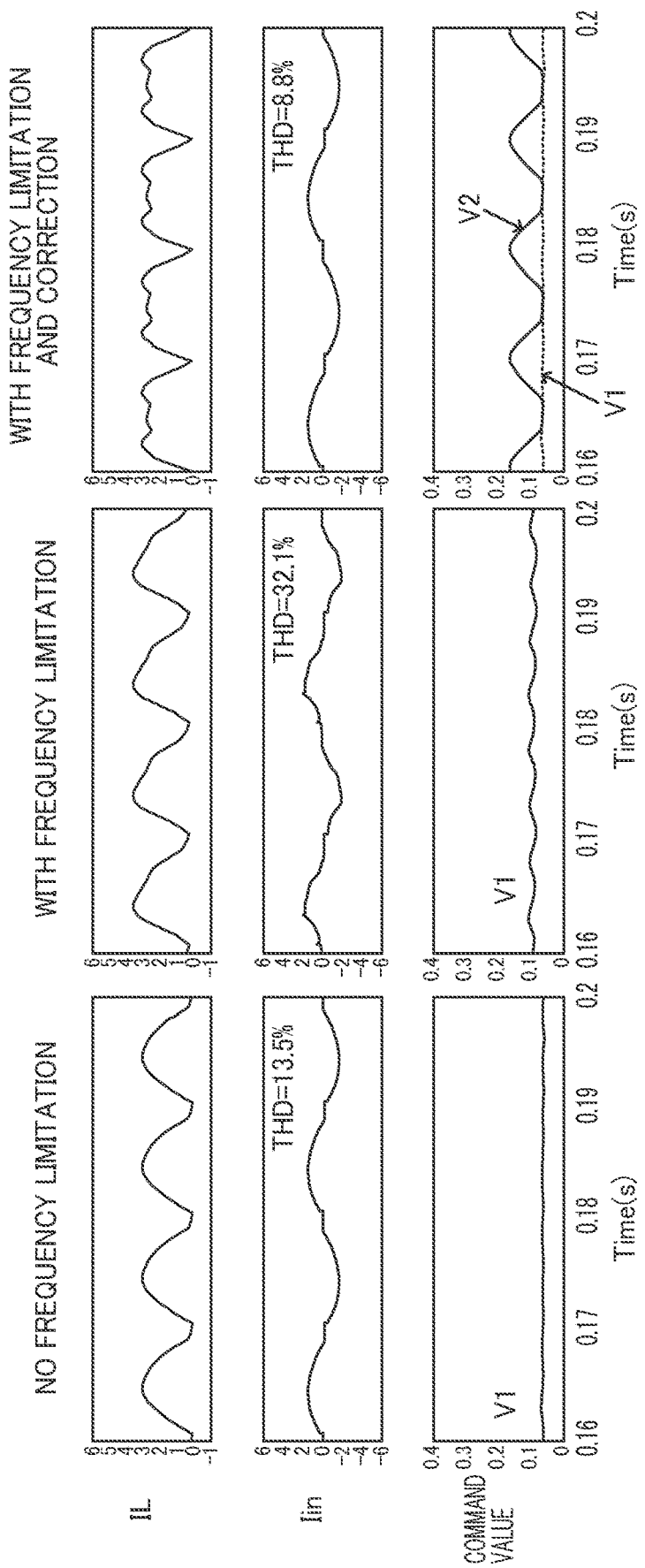
FIG. 12 is a diagram illustrating simulation results.

FIG. 12 is a diagram illustrating main waveforms of the AC-DC converter 10 when the two conditions, which are the frequency limitation and the correction of the command value, are changed in the digital circuit 43. Here, "no frequency limitation" in the first column represent results when the digital circuit 43*a* in FIG. 3 is used as the digital circuit 43. The diagrams in the first row are waveforms of the inductor current IL, and the diagrams in the second row are waveforms of an input current Iin from the commercial power supply illustrated in FIG. 1. Further, the diagrams in the third row are waveforms of the command value V1. In the case of "no frequency limitation", a total harmonic distortion (THD) of the input current Iin is 13.5%, and the power factor is relatively excellent as well.

"With frequency limitation" in the second column represent results when a circuit (not illustrated) having the configuration of the digital circuit 43*b* in FIG. 9 except the correction circuit 71. In this case, the command value V1 from the automatic voltage regulator 62 is inputted to the comparator circuit 64. In the case of "with frequency limitation", the total harmonic distortion of the input current Iin is 32.1%, and the power factor considerably deteriorates as well.

"With frequency limitation and correction" in the third column represents results when the digital circuit 43*b* in FIG. 9 is used as the digital circuit 43. In this case, the total harmonic distortion of the input current Iin is 8.8%, and the power factor is extremely excellent. "With frequency limitation and correction", the switching frequency decreases around the low phase angle of the input voltage Vrec more than the case of "no frequency limitation". This reduces an affect and the like of the current flowing out from the parasitic capacitance of the NMOS transistor 26, to thereby correct the total harmonic distortion and the power factor more than the case of "no frequency limitation".

Other Embodiments

<<Command Value Output Circuit>>

Figure 13:
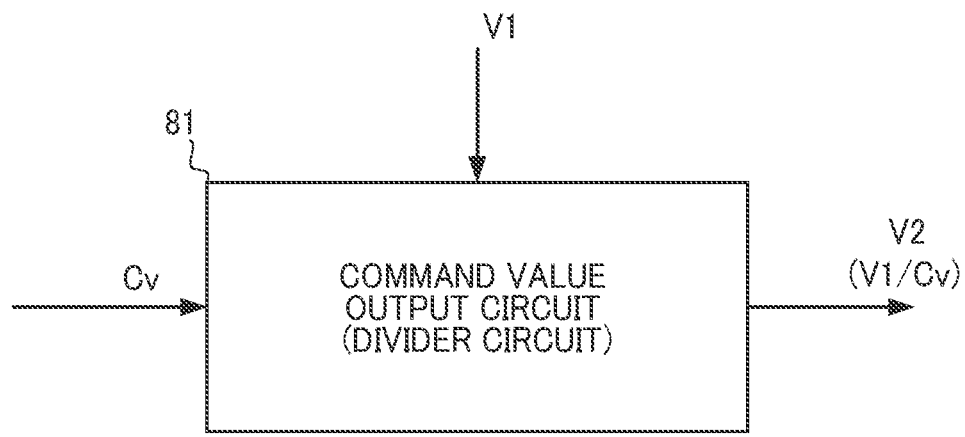
FIG. 13 is a diagram illustrating an example of a command value output circuit 81.

FIG. 13 is a diagram illustrating an example of another embodiment of the command value output circuit 81 in the correction circuit 71. The command value output circuit 81 may be a divider circuit that divides the command value V1 by the value Cv. Even with a use of such a circuit, it is possible to correct the power factor as in an embodiment of the present disclosure.

Further, a circuit that computes the reciprocal of the value Cv is used as the arithmetic circuit 100, however, any type of a circuit may be used as long as the circuit can correct the command value V1 by an amount of correction that decreases with an increase in the value Cv. For example, a subtractor circuit that subtracts the value Cv from a predetermined constant may be used as the arithmetic circuit 100.

Even with the use of such a circuit, it is possible to correct the power factor as in an embodiment of the present disclosure.

<<Another Embodiment of Correction Circuit>>

Figure 14:
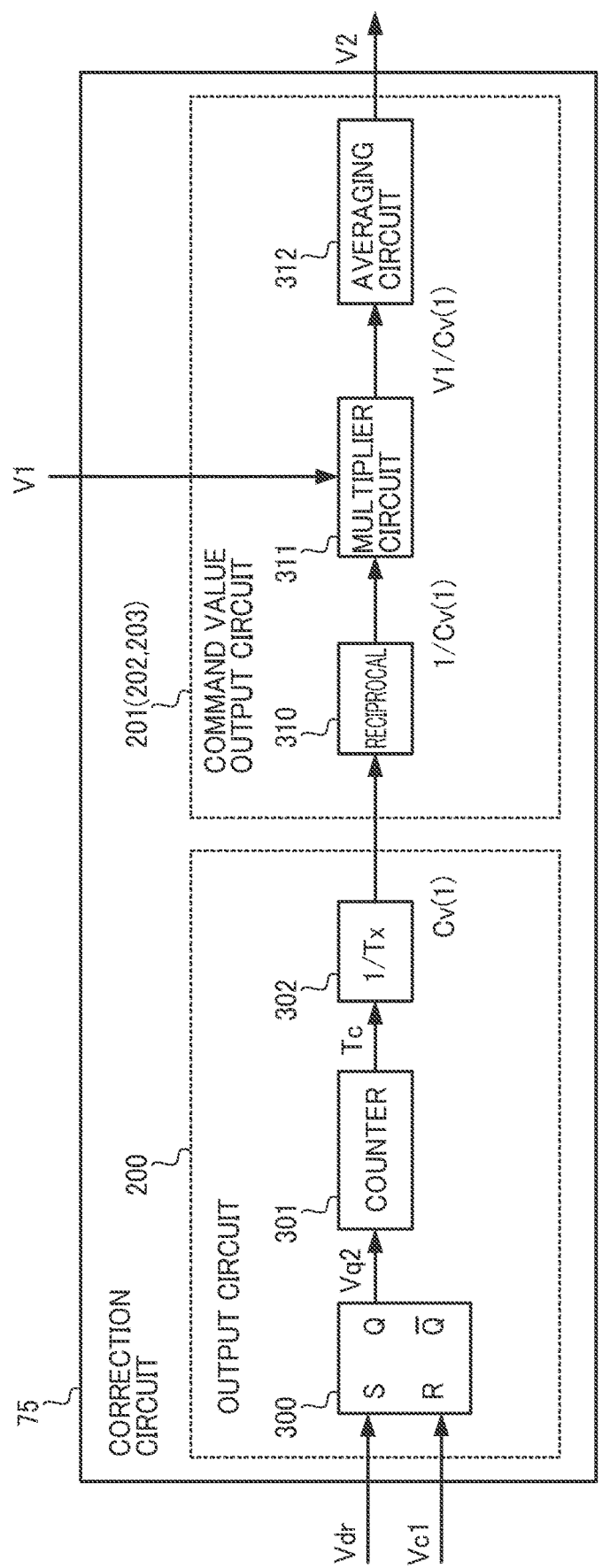
FIG. 14 is a diagram illustrating an example of a correction circuit 75.

FIG. 14 is a diagram illustrating an example of another embodiment of the correction circuit. A correction circuit 75 is to be used in place of the correction circuit 71 in FIG. 9. In the correction circuit 75, a value Cv(1) representing the conductivity C of each cycle is calculated instead of the average value of the conductivities C for several cycles. Details will be described later. Thereafter, in the correction circuit 75, the command value V2 is obtained by averaging the reciprocals of the values Cv(1).

As such, with the averaging processing being executed with respect to the conductivity Cv(1) of each cycle, the on time period Ton2 converges as with the case described with the foregoing expressions (9) and (10). The correction circuit 75 includes an output circuit 200 and a command value output circuit 201.

<Output Circuit 200>

The output circuit 200 outputs the value Cv(1) representing the conductivity C of each cycle (that is, each switching cycle), and the output circuit 200 includes an RS flip-flop 300, a counter 301, and an arithmetic circuit 302.

As with the RS flip-flop 90 in FIG. 10, the RS flip-flop 300 measures the time period during which the inductor current IL is flowing (the time period during which the inductor current IL is larger than zero), in the switching cycle. Specifically, the RS flip-flop 300 outputs the high signal Vq2 in the time period during which the inductor current IL is flowing.

The counter 301 is a time counter that measures the time period during which the inductor current IL is flowing (the time period during which the inductor current IL is larger than zero) based on the high signal Vq2. The counter 301 measures the time period during which the inductor current IL is flowing (hereinafter, referred to as time period Tc), every cycle. The counter 301 corresponds to a "second timer circuit".

The arithmetic circuit 302 computes the value Cv(1) representing the conductivity of each cycle based on the time period Tc measured every cycle and the time period Tx corresponding to the switching cycle. The value Cv(1) is Tc/Tx, and is obtained by dividing Tc by Tx. The arithmetic circuit 302 corresponds to a "first arithmetic circuit".

<Command Value Output Circuit 201>

The command value output circuit 201 corrects the command value V1 by using the value Cv(1) of each cycle, and outputs the command value V2. The command value output circuit 201 includes an arithmetic circuit 310, a multiplier circuit 311, and an averaging circuit 312.

The arithmetic circuit 310 computes the reciprocal of the value Cv(1) of each cycle. The arithmetic circuit 310 corresponds to a "second arithmetic circuit".

The multiplier circuit 311 multiplies the reciprocal of the value Cv(1) received from the arithmetic circuit 310 by the command value V1, and outputs the result of the multiplication (V1/Cv(1)). The result of the multiplication of the multiplier circuit 311 is outputted every switching cycle (every cycle).

The averaging circuit 312 averages the results of the multiplication for several cycles (at least two or more cycles), and outputs a resultant value as the command value V2.

Accordingly, as described with the foregoing expressions (9), (10), and the like, the on time period Ton2 is able to converge to a desired time period as with the correction circuit 71, in a case of using the correction circuit 75 as well. As a result, even in the case of using the correction circuit 75, it is possible to correct the power factor in the AC-DC converter 10. The averaging circuit 312 is implemented by a commonly used digital arithmetic circuit, however, for example, a low-pass filter may be applicable.

<<Another Embodiment of Command Value Output Circuit in Correction Circuit 75>>

Figure 15:
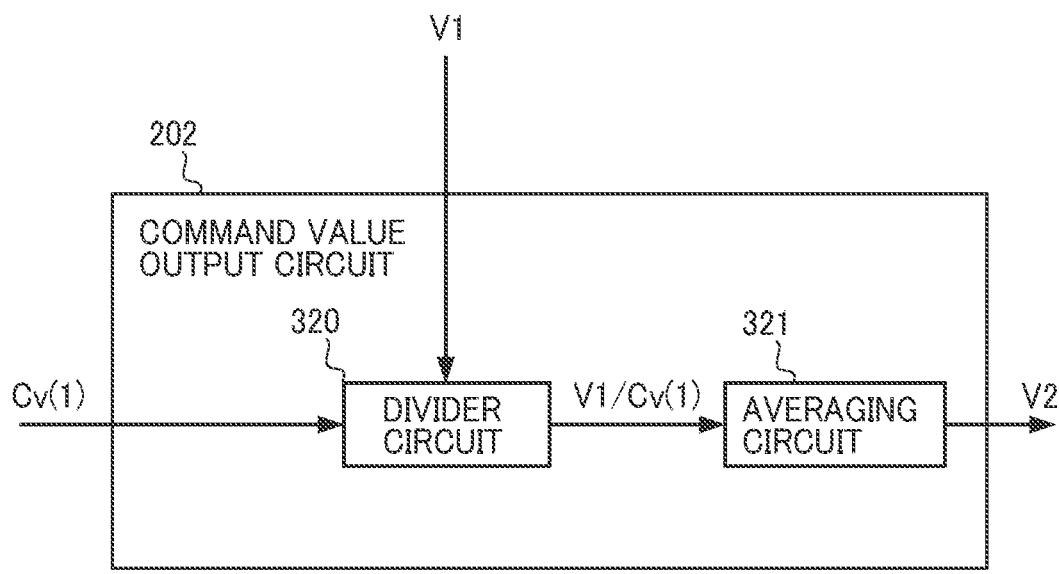
FIG. 15 is a diagram illustrating an example of a command value output circuit 202.

FIG. 15 is a diagram illustrating an example of another embodiment of the command value output circuit used in the correction circuit 75. A command value output circuit 202 is to be used in place of the command value output circuit 201, and includes a divider circuit 320 and an averaging circuit 321.

The divider circuit 320 divides the command value V1 by the value Cv(1) received from the arithmetic circuit 310.

Thus, the divider circuit 320 outputs the result of the division (V1/Cv(1)) every cycle.

As with the averaging circuit 312, the averaging circuit 321 averages the results of the division for several cycles (at least two or more cycles), and outputs a resultant value as the command value V2. Even in a case of using such a command value output circuit 202 in the correction circuit 75, it is possible to correct the power factor in the AC-DC converter 10.

<<Another Embodiment of Command Value Output Circuit in Correction Circuit 75>>

Figure 16:
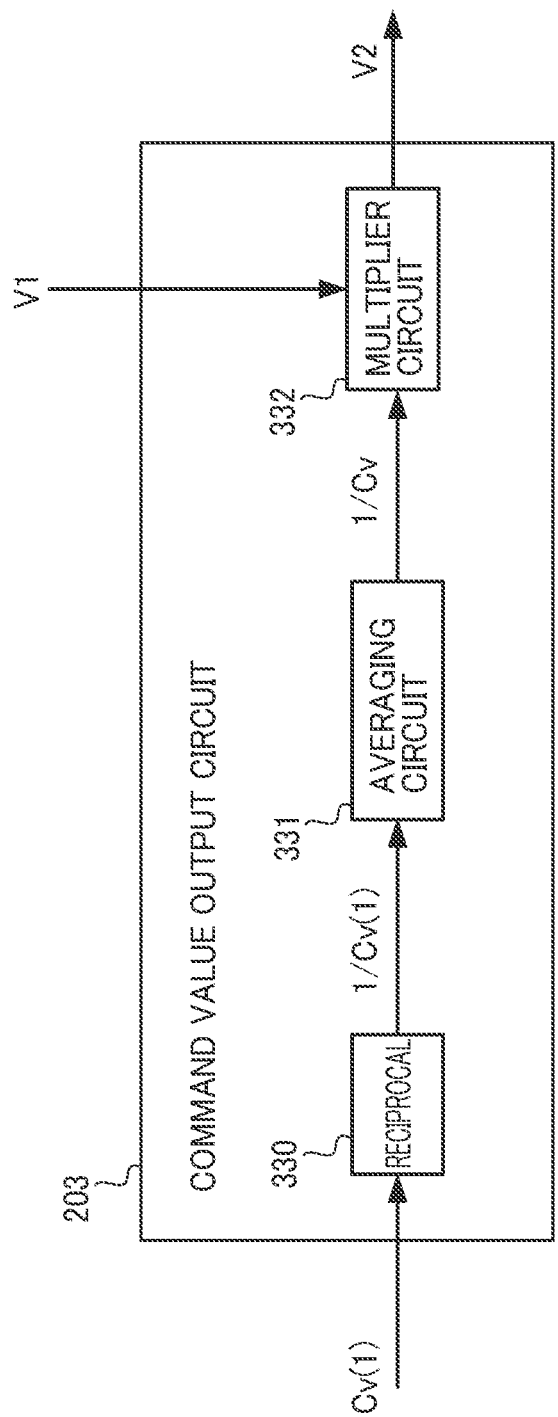
FIG. 16 is a diagram illustrating an example of a command value output circuit 203.

FIG. 16 is a diagram illustrating an example of another embodiment of the command value output circuit used in the correction circuit 75. A command value output circuit 203 is to be used in place of the command value output circuit 201, and includes an arithmetic circuit 330, an averaging circuit 331, and a multiplier circuit 332.

The arithmetic circuit 330 computes the reciprocal of the value Cv(1) of each cycle. The arithmetic circuit 330 corresponds to "another arithmetic circuit".

The averaging circuit 331 averages the reciprocals of the values Cv(1) for several cycles (at least two or more cycles), and outputs a resultant value as 1/Cv.

The multiplier circuit 332 multiples the output from the averaging circuit 321 by the command value V1, and outputs a resultant value as the command value V2. Even in a case of using such a command value output circuit 203 in the correction circuit 75, it is possible to correct the power factor in the AC-DC converter 10.

===Summary===

The AC-DC converter 10 according to an embodiment of the present disclosure has been described above. When the switching frequency is limited, the digital circuit 43b of the power factor correction IC 25 is able to correct the command value V1, to thereby increase the on time period. Accordingly, the power factor correction IC 25 using the digital circuit 43b is capable of correcting the power factor of the AC-DC converter 10.

The correction circuit 71 includes the output circuit 80 that outputs the value Cv representing the conductivity C, and the command value output circuit 81 that corrects the command value V1 by the amount of correction (1/Cv) that decreases with an increase in the value Cv (for example, FIG. 10). As a result, for example, as described with the expressions (9) to (12), the command value V2 converges to a desired value, thereby being able to increase the inductor current IL even in a case where the frequency is limited.

The averaging circuit 91 integrates the signal Vq2 serving as a basis of the conduction rate C, to thereby output the value Cv representing the conduction rate C. As a result, it is possible to obtain the value Cv that accurately reflects the conduction rate C.

In obtaining the conduction rate C, for example, a counter to count the switching cycle and the time period during which the inductor current IL is flowing may be used. However, an embodiment of the present disclosure uses the RS flip-flop 90 that changes the signal Vq2 at the timing to at which the driving signal Vdr goes high and the timing tb at which the inductor current IL reaches zero. Accordingly, in an embodiment of the present disclosure, it is possible to detect the conduction rate C with a simple configuration.

The command value output circuit 81 uses the arithmetic circuit 100 that computes the reciprocal of the value Cv and the multiplier circuit 101 that multiplies the command value V1 by the reciprocal, as a circuit to correct the command value V1. With the use of such a circuit, the on time period when the frequency is limited is able to converge.

As the command value output circuit 81, a divider circuit can be used as illustrated in FIG. 13, for example. Even in a case of using such a circuit, it is possible to correct the power factor.

It is possible to correct the power factor, as in an embodiment of the present disclosure, also by using the correction circuit 75 illustrated in FIG. 14 in place of the correction circuit 71, for example.

In the correction circuit 75, the value Cv(1) of each cycle is computed. Then, the averaging circuit 312 averages results obtained by multiplying the value Cv(1) of each cycle by the command value V1.

Even with such a configuration, it is possible to correct the power factor as in an embodiment of the present disclosure.

The correction circuit 75 uses the command value output circuit 201 that employs the multiplier circuit 311. However, it is not limited thereto, and the command value output circuit 202 including the divider circuit 320 as illustrated in FIG. 15 may be used.

In the command value output circuit 201, the results of the multiplication are averaged, however, it is not limited thereto. For example, in the command value output circuit 203 illustrated in FIG. 16, the reciprocals of the values Cv(1) for respective single cycles are averaged by the averaging circuit 331. The multiplier circuit 332 then outputs, as the command value V2, a result obtained by multiplying the output from the averaging circuit 331 by the command value V1. Even with such a configuration, it is possible to obtain effects similar to those in an embodiment of the present disclosure.

The power factor correction IC 25 includes the AD converter 41 that converts the voltage VL into a digital value and the AD converter 42 that converts the feedback voltage Vfb into a digital value. In an embodiment of the present disclosure, the digital circuit 43 is used in a main part of the power factor correction IC 25. However, an analog circuit having a similar function may be used to implement such a configuration. Even in such a case, it is possible to correct the power factor as in an embodiment of the present disclosure.

The present disclosure is directed to provision of a switching control circuit capable of correcting a power factor of a power factor correction (PFC) circuit.

According to the present disclosure, it is possible to provide a switching control circuit capable of correcting a power factor in a PFC circuit.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. A switching control circuit for a power supply circuit configured to generate an output voltage at a target level from an alternating-current (AC) voltage inputted thereto, the power supply circuit including
   an inductor configured to receive a voltage corresponding to the AC voltage,
   a transistor configured to control an inductor current flowing through the inductor,
the switching control circuit being configured to control switching of the transistor, the switching control circuit comprising:
   a first command value output circuit configured to output
      a first command value corresponding to a difference between a feedback voltage corresponding to the output voltage and a reference voltage;

a correction circuit configured to correct the first command value, to output a resultant value as a second command value;

a first timer circuit configured to measure a first time period starting from a first timing at which the transistor is turned on; and a driving signal output circuit configured to
output a driving signal to turn on the transistor in response to the inductor current reaching a predetermined value and the first time period having elapsed since the first timing, and
output the driving signal to turn off the transistor based on the second command value, wherein the correction circuit corrects the first command value to thereby cause an on time period during which the transistor is on to increase, in a case where the first time period has elapsed since the first timing, after the inductor current reaches the predetermined value.

2. The switching control circuit according to claim 1, wherein the correction circuit includes
an output circuit configured to output a value corresponding to a proportion of a second time period during which the inductor current is flowing, in the first time period, and
a second command value output circuit configured to correct the first command value by an amount of correction that decreases with an increase in the proportion, to thereby obtain the second command value.

3. The switching control circuit according to claim 2, wherein the output circuit includes
a signal output circuit configured to output a signal that reaches a first level in a time period from the first timing to a second timing at which the inductor current reaches the predetermined value, and reaches a second level in a time period from the second timing to the first timing, and
an averaging circuit configured to average the signal, to thereby obtain the value.

4. The switching control circuit according to claim 3, wherein
the signal output circuit is a flip-flop configured to
output the signal at the first level based on the first timing, and
output the signal at the second level based on the second timing.

5. The switching control circuit according to claim 3, wherein the second command value output circuit includes
an arithmetic circuit configured to compute a reciprocal of the value, and
a multiplier circuit configured to multiply a computation result of the arithmetic circuit by the first command value.

6. The switching control circuit according to claim 3, wherein the second command value output circuit is a divider circuit configured to divide the first command value by the value.

7. The switching control circuit according to claim 2, wherein the output circuit includes
a second timer circuit configured to measure the second time period, and
a first arithmetic circuit configured to compute the value in every switching cycle based on the second time period measured by the second timer circuit and the first time period.

8. The switching control circuit according to claim 7, wherein the second command value output circuit includes
a second arithmetic circuit configured to compute a reciprocal of the value,
a multiplier circuit configured to multiply a computation result of the second arithmetic circuit by the first command value, and
an averaging circuit configured to average an output of the multiplier circuit.

9. The switching control circuit according to claim 7, wherein the second command value output circuit includes
a divider circuit configured to divide the first command value by the value, and
an averaging circuit configured to average an output of the divider circuit.

10. The switching control circuit according to claim 7, wherein the second command value output circuit includes
another arithmetic circuit configured to compute a reciprocal of the value,
an averaging circuit configured to average a computation result of the another arithmetic circuit, and
a multiplier circuit configured to multiply an output of the averaging circuit by the first command value.

11. The switching control circuit according to claim 1, further comprising:
a first analog-to-digital (AD) converter configured to convert the feedback voltage into a digital value; and
a second AD converter configured to convert a voltage corresponding to the inductor current into a digital value.

12. A power supply circuit configured to generate an output voltage at a target level from an alternating-current (AC) voltage inputted thereto, the power supply circuit comprising:
an inductor configured to receive a voltage corresponding to the AC voltage;
a transistor configured to control an inductor current flowing through the inductor; and
a switching control circuit configured to control switching of the transistor, wherein the switching control circuit includes
a first command value output circuit configured to output a first command value corresponding to a difference between a feedback voltage corresponding to the output voltage and a reference voltage,
a correction circuit configured to correct the first command value, to output a resultant value as a second command value,
a first timer circuit configured to measure a first time period starting from a first timing at which the transistor is turned on, and
a driving signal output circuit configured to
output a driving signal to turn on the transistor in response to the inductor current reaching a predetermined value and the first time period having elapsed since the first timing, and
output the driving signal to turn off the transistor based on the second command value, and wherein
the correction circuit corrects the first command value to thereby cause an on time period during which the transistor is on to increase, in a case where the first time period has elapsed since the first timing, after the inductor current reaches the predetermined value.

* * * * *